April 7, 1936.　　　F. SCHAEFER　　　2,036,363
FOLDABLE SILO
Filed May 1, 1935
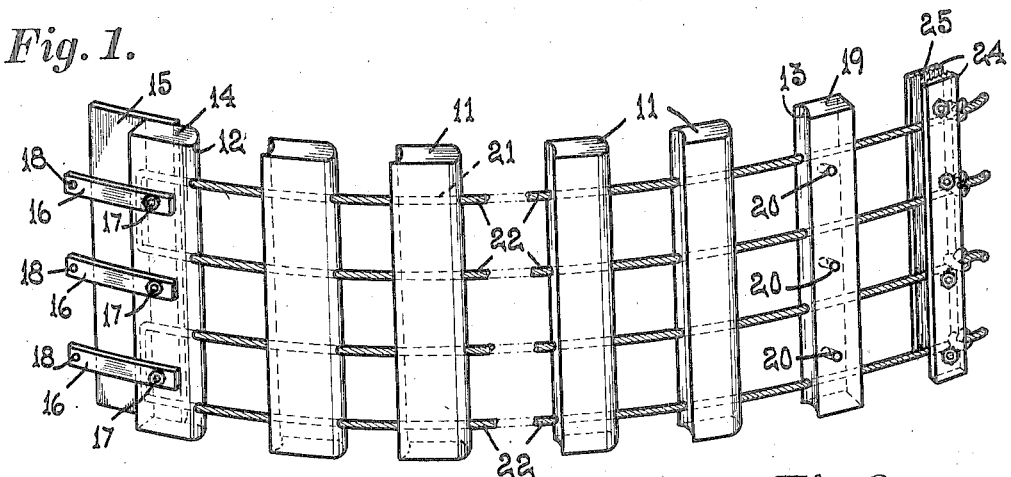
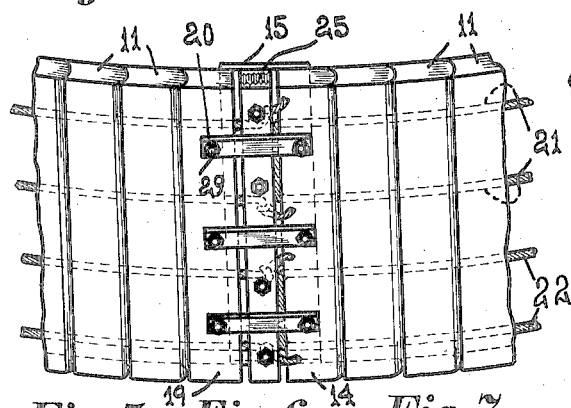
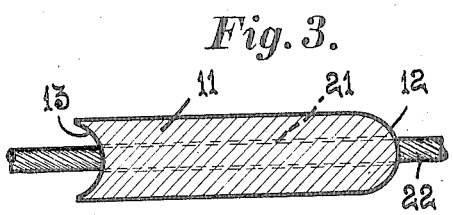
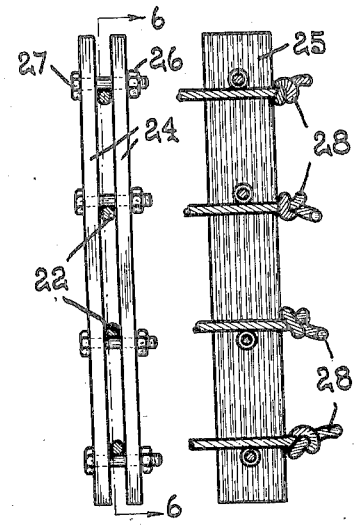
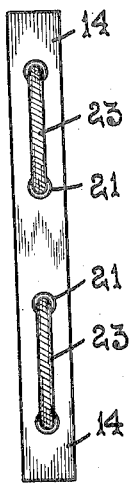
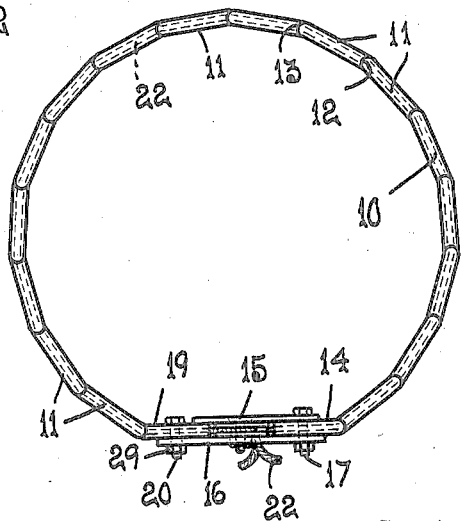
Inventor
*Fred Schaefer*
Arthur H. Sturges.
Attorney Patented Apr. 7, 1936

2,036,363

UNITED STATES PATENT OFFICE 2,036,363

FOLDABLE SILO

Fred Schaefer, Creighton, Nebr.

Application May 1, 1935, Serial No. 19,224

2 Claims. (Cl. 20—1.4)

This invention relates to silo constructions and more particularly to a foldable silo wall.

It is an object of the invention to provide means for readily erecting a silo wall during years and seasons when the same is of advantage and which can readily be taken down and rolled up when not in use and compactly stored for use during future advantageous occasions.

With the foregoing and other objects in view the invention will be more fully described hereinafter and more particularly pointed out in the claims appended hereto.

In the drawing, wherein like symbols refer to like or corresponding parts throughout the several views:

Figure 1 is a perspective view of silo wall parts embodying the present invention, certain portions thereof being removed.

Figure 2 is a perspective view of a fragment of the wall.

Figure 3 is a transverse section of a wall slat employed.

Figure 4 is a top plan view of the silo.

Figure 5 is an edge view of a cable clamp employed.

Figure 6 is a vertical section taken on line 6—6 of Figure 5 of the cable clamp and turned at a right angle with respect to the showing thereof in Figure 5.

Figure 7 is a vertical elevation showing an edge of an end slat employed.

It is well known in the art that, as heretofore practiced, during certain years and in accordance with drought conditions ensilage such as unmatured corn and the stalks thereof may be advantageously and economically cut and stored for cattle fodder purposes at which times silos are in demand. A majority of the years yield a matured crop resulting in no demand or use for a silo whereby it is generally impractical from a financial standpoint to provide a permanent silo for one or a small farm and the present invention contemplates the provision of an economical construction for the storage of ensilage should occasion demand and which can be readily used for other purposes, such as storage of husked matured corn or the like during crop producing years or may be readily rolled upon and compactly stored pending future use.

Referring now to the drawing for a more particular description, 10 indicates generally a silo wall which includes any desired number of elongated slats 11, the latter being of any suitable length, width and thickness as may be desired. Preferably the slats are formed of durable wood or may be formed of conventional lumber impregnated with creosote or suitable preservatives as may be desired.

The longitudinal edges of the slats 11 are, as best shown in Figure 3, each provided with a convexed surface 12 which is substantially semicircular in plan and an oppositely disposed concave surface 13 of a corresponding shape to the surface 12, whereby in use the convex surface 12 of a slat may be received into the concave surface 13 of a next adjoining slat, as best shown in Figures 2 and 4.

An end-slat 14 is provided with a convexed surface 12 and is preferably formed of oak having a tongue 15 formed preferably of sheet iron secured thereto as shown in Figure 1. Strap iron latches 16 are pivotally secured to the end slat 14 by means of suitable bolts or keepers 17, said latches being provided at their outer ends with apertures 18 for purposes later described.

An end-anchor-slat 19 having a concave surface 13 is provided with threaded detents or stud bolts 20 equi-distantly spaced apart a distance corresponding to the distance between the latches 16.

The heretofore mentioned slats are provided with apertures 21 extending transversely therethrough for the reception of a plurality of cables 22, preferably two cables being employed. The medial portion 23 of a cable is placed as shown in Figure 7 against the edge of the end-slat 14 and the free ends of the cable inserted through said slat, other slats 11 being added to the construction as may be desired for providing a silo wall of any desired diameter and capacity. The anchor-slat 19 being assembled last upon the cables with the exception of the cable clamps 24.

As best shown in Figures 5 and 6 a cable clamp or vice includes two oppositely disposed members which are preferably formed of iron having serrated or rugose surfaces 25 which are assembled facing toward each other with the cables 22 therebetween, said cables being firmly secured to the vice by means of rotating the nuts 26 of the bolts 27. If desired knots 28 may be provided in the ends of the cables, the latter preferably being of woven steel wire construction.

To erect a silo wall after sufficient slats 11 have been placed upon the cables 22 in accordance with the diameter desired for the silo, the latter being governed by the amount of ensilage to be stored. the slats are moved together as shown in Figures 2 and 4 and the nuts 26 of the clamps tightened; whereupon the construction is placed in a position with the slats extending vertically and the construction as a whole providing a ring formation in plan.

The latches 16 are now placed in register with the detents 20 and nuts 29 placed upon said detents and tightened providing a construction which stands vertically and requires no particular leveling of the ground for the erection thereof.

In use the silo being filled with fodder a canvas cover or roof therefor may be provided if desired. It will be noted that as shown in Figure 4 a substantially air-tight silo is provided as to the side wall thereof and in accordance with whether or not, in assembling the silo parts, the cables 22 are drawn taut and the cable clamps 24 placed rigidly abutting the anchor-slat 19 or a space left between the slats at times when it is desired to employ the construction for uses similar to that of a corn crib. At times when a tight silo wall is desired and erected the tongue 15 is disposed overlying the cable clamps 24 for said purpose extending from the end slat 14 to an abutting relation with the anchor slat 19 as shown in Figures 2 and 4.

It is obvious that various changes and modifications may be made in the details of construction and design of the above specifically described embodiment of this invention without departing from the spirit thereof, such changes and modifications being restricted only by the scope of the following claims.

I claim:—

1. A collapsible silo wall comprising the plurality of slats having opposite convex and concave edge portions adapted to interfit, opposite end slats, cables threaded through the slats for holding the same together, one end slat having a backing tongue and a plurality of latch bars, and a clamp for the ends of said cables for positioning against said backing tongue and between the end slats, said latch bars adapted for connection at their free ends with the opposite end slat.

2. A collapsible silo wall comprising a row of slats having interfitting edge portions, a plurality of cables threaded through the slats for holding the same together, a pair of clamping bars secured at opposite sides of the ends of the cables and adapted to lie between the opposite end slats of the row, a backing tongue carried by one end slat for overlapping the clamping bars and the opposite end slat and latch bars secured over the opposite side of the clamping bars and across the said end slats.

FRED SCHAEFER.